(12) United States Patent
Connor et al.

(10) Patent No.: US 8,413,198 B2
(45) Date of Patent: Apr. 2, 2013

(54) SYSTEM AND METHOD FOR THE CONTROLLED ON-DEMAND DISTRIBUTION OF CONTENT VIA A CENTRALIZED SERVER AND A PEER-TO-PEER NETWORK

(75) Inventors: Patrick Connor, Portland, OR (US); Scott P. Dubal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1017 days.

(21) Appl. No.: 10/987,344

(22) Filed: Nov. 12, 2004

(65) Prior Publication Data
US 2006/0107286 A1 May 18, 2006

(51) Int. Cl.
*H04N 7/173* (2011.01)
(52) U.S. Cl. .............. 725/105; 725/78; 725/86; 725/87; 725/109; 725/114
(58) Field of Classification Search .................... 725/25, 725/109, 78, 86–87, 105, 114
See application file for complete search history.

(56) References Cited

U.S. PATENT DOCUMENTS

| 7,219,153 | B1 * | 5/2007 | Day .............................. 709/229 |
| 7,574,488 | B2 * | 8/2009 | Matsubara .................... 709/219 |
| 2002/0049760 | A1 * | 4/2002 | Scott et al. ...................... 707/10 |
| 2002/0138744 | A1 * | 9/2002 | Schleicher et al. ........... 713/187 |
| 2003/0118014 | A1 * | 6/2003 | Iyer et al. ...................... 370/389 |
| 2003/0145093 | A1 * | 7/2003 | Oren et al. .................... 709/229 |
| 2004/0168184 | A1 * | 8/2004 | Steenkamp et al. ............ 725/31 |
| 2005/0204382 | A1 * | 9/2005 | Ellis ............................... 725/35 |

* cited by examiner

*Primary Examiner* — Pankaj Kumar
*Assistant Examiner* — Mulugeta Mengesha
(74) *Attorney, Agent, or Firm* — Trop, Pruner & Hu, P.C.

(57) ABSTRACT

A method and system for providing controlled on-demand distribution of content via a centralized server and a peer-to-peer network have been described. The method may include receiving, at a server, a request from a client for content where the requesting client and the server are part of a peer-to-peer network. The server may then determine whether the requesting client has access rights to the content. If the requesting client has access rights to the content, then the server may determine one or more other clients on the peer-to-peer network that have the content available for download. The server may then select one or more clients from the one or more other clients and allow the requesting client to download the content from the selected one or more clients. Other embodiments have also been described and claimed.

24 Claims, 4 Drawing Sheets

SYSTEM AND METHOD FOR THE CONTROLLED ON-DEMAND DISTRIBUTION OF CONTENT VIA A CENTRALIZED SERVER AND A PEER-TO-PEER NETWORK

BACKGROUND

The importance for a service provider (e.g., a television service provider) to continuously strive to provide an increased variety of content and options to its subscribers cannot be overstated. No doubt this is one of the reasons why television service providers provide different types of services to their subscribers including on-demand pay-per-view programming, a variety of subscription options for broadcasted programs, subscriber-defined controls such as parental controls and cable modem Internet access.

But still there are limitations to some of these types of service. For example, with on-demand pay-per-view programming a subscriber can request that a program be displayed on his or her television. But, the subscriber is limited to selecting a program that the television service provider has stored on one or more centralized servers. The number of programs that the provider can store on the centralized server(s) is limited by storage space on the server(s) and the bandwidth required to satisfy all of the requests from its subscribers. Regarding broadcasted programs that are included in a subscription with the television service provider, if the subscriber cannot watch a particular program and forgets to record it or did not realize that a program was broadcasted until after the fact, then the subscriper has to wait until the program is broadcasted again in order to view the program.

As discussed above, if a subscriber knows of a particular program that will be broadcasted, then the subscriber can record the program via a personal video recorder (PVR). PVR's allow a user to record a broadcasted program for later viewing. Unfortunately, the programs recorded on a PVR can only be viewed locally where the PVR is physicaly located.

BRIEF DESCRIPTION OF THE DRAWINGS

The invention may be best understood by referring to the following description and accompanying drawings that are used to illustrate embodiments of the invention. In the drawings.

DESCRIPTION OF EMBODIMENTS

Figure 1:
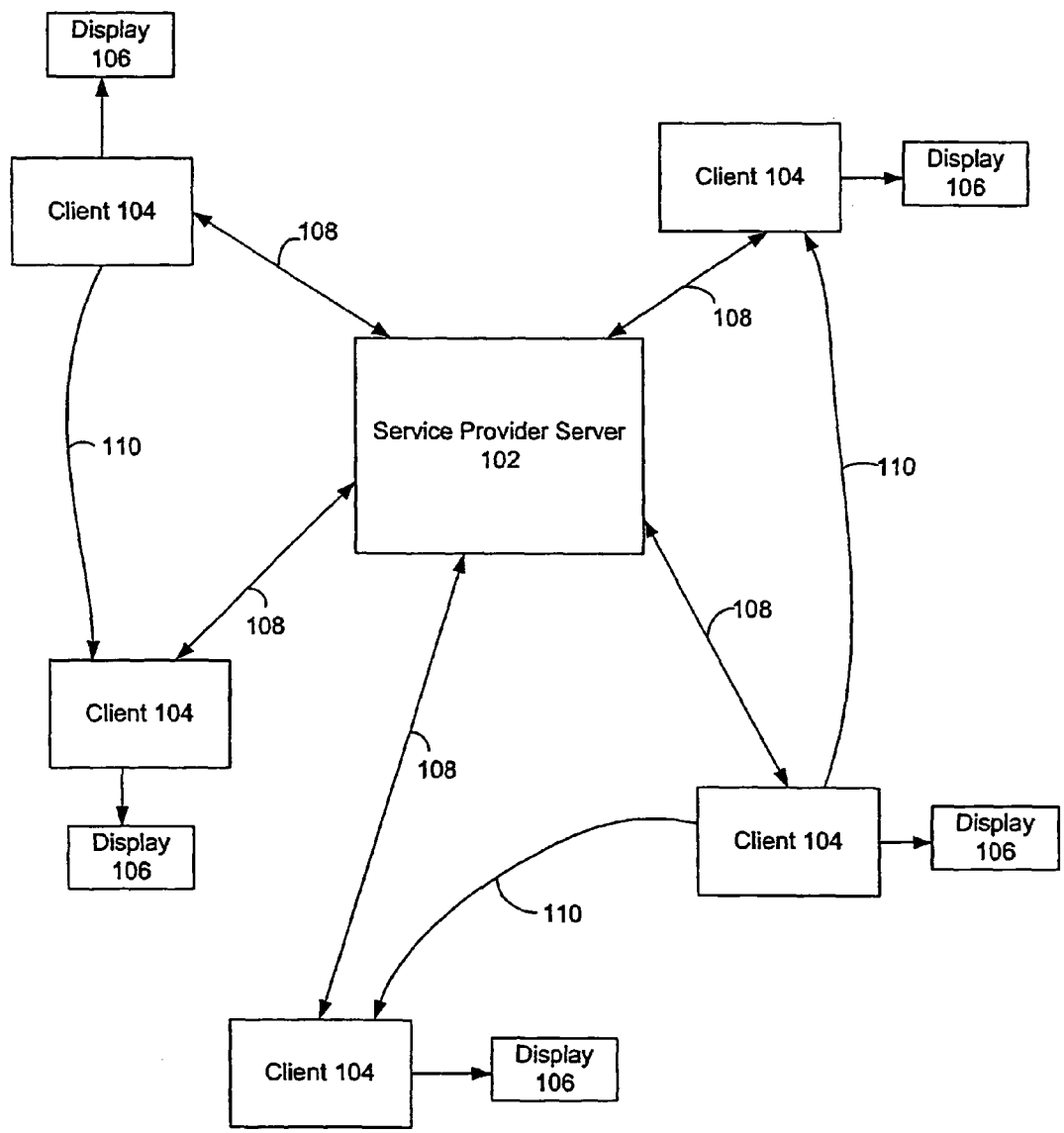
FIG. 1 illustrates one embodiment of an centralized service provider server in a peer-to-peer environment in which some embodiments of the present invention may operate.

A method and system for providing controlled on-demand distribution of content via a centralized server and a peer-to-peer network are described. In an embodiment of the invention, a service provider hosts a centralized server that stores information about each of it subscribers (or clients) and available content for each of its subscribers to download on demand. The centralized server operates within a peer-to-peer network where each of its subscribers agrees to provide content that he or she has stored locally on a recording device. When a subscriber logs into or connects with the centralized server, the subscriber informs the server about the different content he or she has stored on his or her recording device. Thus, the centralized server knows at all times what content is currently available for any of its subscribers to request. Yet, the centralized server only keeps some sort of listing of the content and not the content itself. Therefore, the disk storage limitation and bandwidth problems as described above are avoided.

The distribution of the on-demand content is controlled because the service provider hosts the centralized server where subscriber information is stored, the service provider knows which content is included in a particular subscription with the service provider and knows of subscriber-defined controls (e.g., parental controls) set up by the subscriber. Therefore, the service provider, prior to allowing requested content to be distributed to the subscriber, can determine whether the subscriber has access rights to the requested content and whether the subscriber-defined controls allow for the content to be viewed.

For illustrations purposes only, the present invention is described herein in terms of the service provider being a television service provider. It is important to note that the present invention is not limited to facilitating television service providers in the controlled on-demand distribution of its content or programs. For example, the service provider may also be a music service provider, a photograph service provider, or any company that wants to distribute controlled on-demand content. In another embodiment of the invention, the service provider server described herein may be generic in the sense that no particular service provider hosts the server. Here, multiple service providers provide the necessary information to the generic server for the server to provide each of their subscriber's with controlled on-demand distribution of content.

In the following description, for purposes of explanation, numerous specific details are set forth. It will be apparent, however, to one skilled in the art that embodiments of the invention can be practiced without these specific details.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

FIG. 1 illustrates one embodiment of a centralized service provider server in a peer-to-peer environment in which some embodiments of the present invention may operate. Referring to FIG. 1, the peer-to-peer environment in one embodiment may include, but is not necessarily limited to, a centralized service provider server 102, one or more clients 104, one or more displays 106, one or more network connections 108 and one or more data flow connections 110. Each of these components is described in more detail next.

In an embodiment of the invention, a service provider (e.g., a television service provider) hosts centralized server 102. Server 102 may store, but is not limited to, information about each of it subscribers and available content for each of its subscribers to download on demand. Server 102 operates within a peer-to-peer network where each of its subscribers agrees to provide content that he or she has stored locally on a recording device. In the peer-to-peer network of FIG. 1 each client 104 is a peer to other clients 104 in the network.

Client 104 represents such a recording device that is modified to also be a server. Client 104 is owned, borrowed or licensed by each subscriber. Client 104 communicates with server 102 via network connection 108. Network connection 108 may be a high speed Internet connection or any other type of connection suited for the particular application. Other types of connections may be added or substituted as new connections are developed.

In one embodiment of the present invention, client 104 includes not only personal video recorder (PVR) functionality but is also modified to act as a server in the peer-to-peer network. PVR functionality records television data in digital format (e.g., MPEG-1 or MPEG-2 formats) and stores the data in a hard drive. In the case of digital media streams, the PVR functionality routes the previously encoded digital media stream to local storage. PVR functionality of client 104 may allow encoding of other types of data and other types of data may be added or substituted for those described as new types of data are developed.

In an embodiment, client 104 is associated with display 106. Display 106 may be a monitor, projector, a conventional analog television receiver, or any other kind of perceivable video display. The audio portion of the output of client 104 may be routed through an amplifier, such as an audio/video (A/V) receiver or a sound processing engine, to headphones, speakers or any other type of sound generation device. The outputs may also be sent to an external recorder, such as a VTR, PVR, CD or DVD recorder, memory card, etc.

When a subscriber at client 104 logs into or connects with the server 102, the subscriber informs server 102 about the different content he or she has stored at client 104. Thus, server 102 knows at all times what content is currently available for any of its subscribers to request and where the content is stored in the peer-to-peer network. Yet, server 102 only keeps some sort of listing of the content and not the content itself. The content itself is stored over the peer-to-peer network at clients 104. Thus, when a subscriber via client 104 requests a particular program, server 102 determines whether any of the currently connected or logged in clients are storing the requested program. If so, and the requesting client has access rights to the program, then server 102 determines the best client from which to download the program to the requesting client. In order to facilitate the download of the requested program, server 102 may implement a variety of data flow connections 110. For example, server 102 may send a command to the client storing the program to download the program to the requesting client. Alternatively, server 102 may send a uniform resource locator (URL) to the requesting client to access the program on the client storing the program. These examples are not meant to limit the invention.

As stated above, server 102 determines whether the requesting subscriber has access rights to the program requested. Because the television service provider hosts server 102 where subscriber information is stored, the television service provider knows which programs are included in a particular subscription and knows of subscriber-defined controls (e.g., parental controls) set up by the subscriber. For example, a subscriber may have a basic cable subscription that includes only local channels 2 through 24 and no speciality channels (such as a movie channel). Assume that the subscriber misses a program on channel 2 and requests that the particular program be downloaded to its associated recording device or client 104. The television service provider checks via server 102 that the subscriber has access rights to the requested program before distributing it to the subscriber. In addition, the television service provider checks via server 102 whether subscriber-defined controls (such as parental controls) allow for the content to be viewed before distributing it to the subscriber. The specific devices and configuration shown in FIG. 1 represent one example that may be suitable for a controlled on-demand distribution of content and is not meant to limit the invention.

Figure 2:
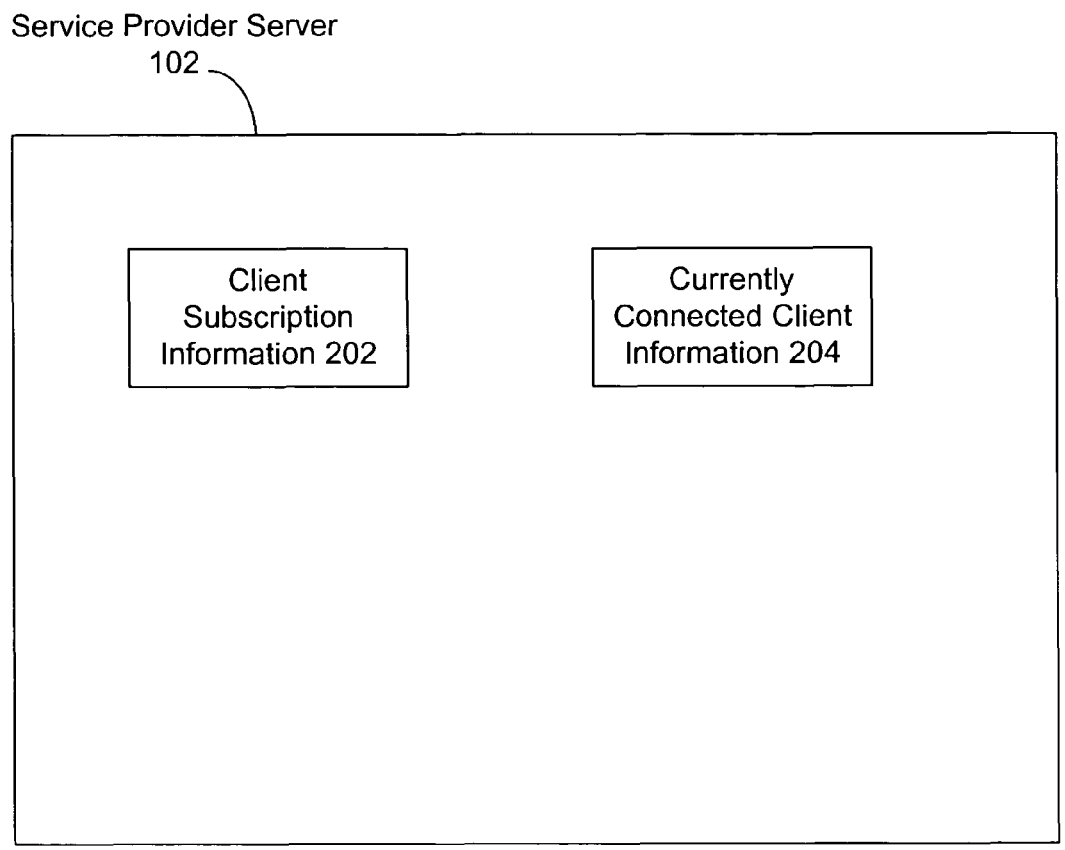
FIG. 2 illustrates one embodiment of the types of information the service provider server may utilize in providing controlled on-demand distributed content or programs to its subscribers.

FIG. 2 illustrates one embodiment of the types of information service provider server 102 may utilize in providing controlled on-demand distributed content or programs to its subscribers. As shown in FIG. 2 and in an embodiment, server 102 may include client subscription information 202 and currently connected client information 204. Client subscription information 202 may include, but is not necessarily limited to, subscription information, subscriber-defined controls (e.g., parental controls), the network address of client 104 associated with each subscriber, and so forth. Currently connected client information 204 may include, but is not necessarily limited to, a listing of which clients 104 (or subscribers) are currently logged into server 102 and a listing of the programs stored on each of clients 104. Embodiments of the operation of the present invention are described next with reference to FIGS. 3 and 4.

Figure 3:
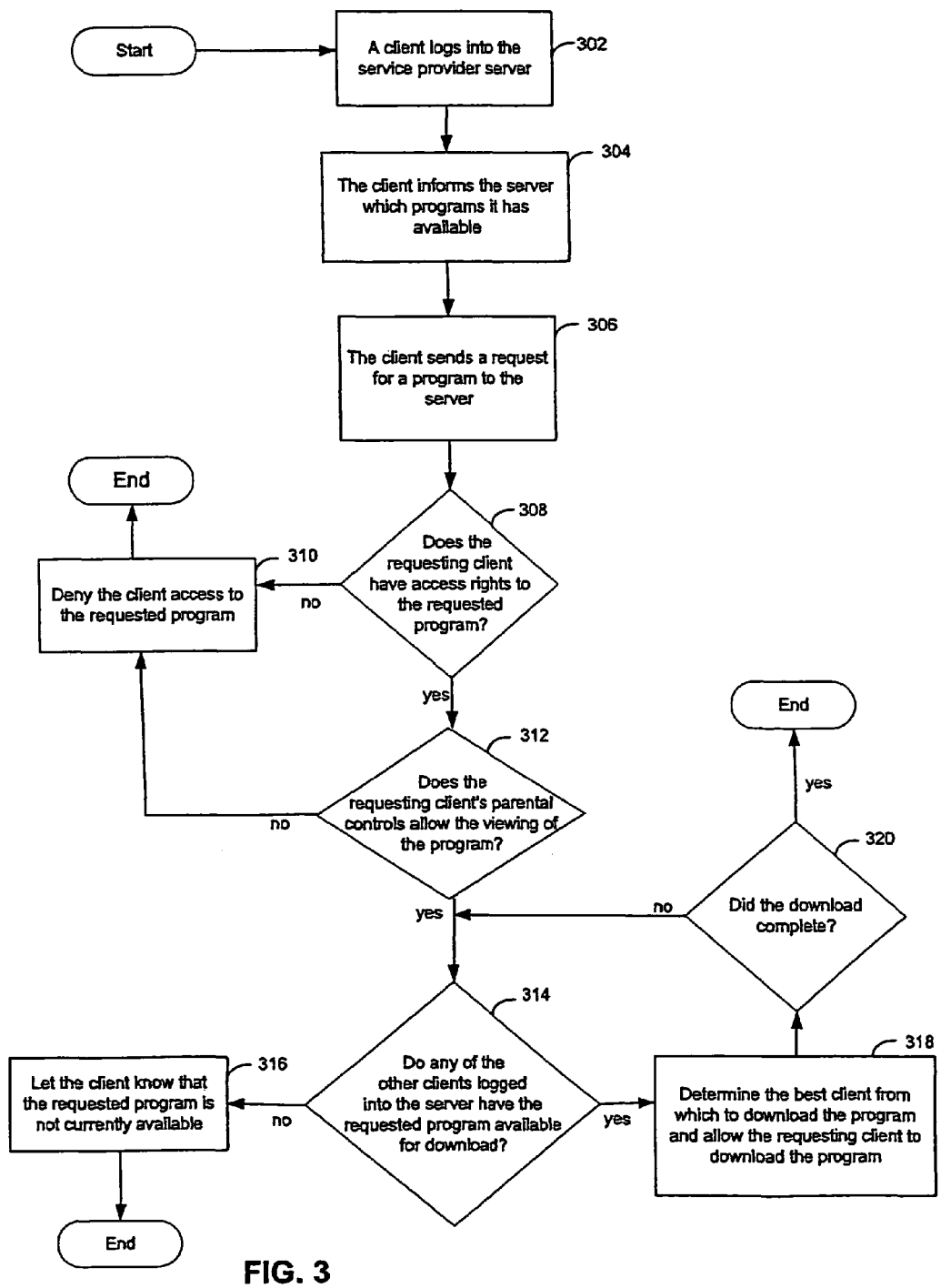
FIG. 3 is a flow diagram of one embodiment of a process for providing controlled on-demand distributed content or programs via a peer-to-peer network.

FIG. 3 is a flow diagram of one embodiment of a process for providing controlled on-demand distributed content or programs via a peer-to-peer network. Referring to FIG. 3, the process begins at processing block 302 where a subscriber via a client (e.g., one of clients 104) logs into server 102. At processing block 304, the client informs server 102 which programs it has available to share with other clients in the peer-to-peer network. As described above, server 102 maintains a listing of the clients currently logged into the server and a listing of their available programs.

At processing block 306, client 104 sends a request for a program to server 102. This request may include, but is not limited to, the type of program (e.g., broadcasted on a channel or included in a listing of pay-per-view programs), the title of the program, the channel the programmed was broadcasted (if applicable), the date and time the program was broadcasted (if applicable), and so forth.

At decision block 308, server 102 determines whether the requesting client has access rights to the requested program. Decision block 308 is described in more detail below with reference to FIG. 4. If the outcome to decision block 308 is negative, then control passes to processing block 310 where the requesting client is denied access to the program. The flowchart of FIG. 3 ends at this point. Alternatively, if it has been determined that the client has access rights to the requested program then control transfers to decision block 312.

At decision block 312, server 1-2 determines whether the requesting client's controls (e.g., parental controls) allow the viewing of the requested program. If the outcome to decision block 312 is negative, then control passes to processing block 310 where the requesting client is denied access to the program. The flowchart of FIG. 3 ends at this point. Alternatively, if it has been determined that the client's controls allow the viewing of the requested program then control transfers to decision block 314.

At decision block 314, server 102 determines whether any of the other clients currently logged into server 102 have the requested program available for download. If the outcome of decision block 314 is negative, then control passes to processing block 316 where the requesting client is informed that the requested program is not available for download at this time.

Alternatively, if it has been determined that the requested program is available then control transfers to processing block 318.

At processing block 318, server 102 determines which is the 'best' client from which to download the program and allows the requesting client to start downloading the program. The 'best' client from which to download the program may be determined by a variety of methods. For example, it may be determined that the 'best' client is the one located closer to the requesting client, or may be the one closest to the requesting client that is not currently downloading another program to a different client, or maybe the client who most recently logged into server 102, and so forth. As described above, the downloading of the requested program may be accomplished in a variety of ways. For example, server 102 may send a command to the client storing the program to download the program to the requesting client. Alternatively, server 102 may send a URL to the requesting client to access the program on the client storing the program. These are only examples of the many ways in which the invention may determine the 'best' client and the means to download the program. These examples are not meant to limit the invention. In an embodiment of the invention, server 102 may inform the requesting client of all of the other clients from which the requested program may be downloaded. Here, assuming the program is divided into chapters 1-10, the requesting client may decide to download part of the requested program from one client (e.g., chapters 1-5) and another part from another client (e.g., chapters 6-10) in the hopes to reduce the overall download time and to share the burden across multiple clients.

At decision block 320, it is determined whether the download of the requesting program completed. If the outcome to decision block 320 is positive, then the flowchart of FIG. 3 ends. Alternatively, the process goes back to decision block 314. Here, if a program is downloading from a client and the client is turned off prior to the download completing, then the program may no longer be available to complete the download. There are a number of procedures that may be incorporated by server 102 to try to avoid this scenario. For example, if server 102 decides to download a program for a particular client, then server 102 may send some sort of indication (e.g., email) to the client storing the program that a program is going to be downloaded and to please not turn the client off. Once the download is completed, another indication may be sent to the client storing the program from server 102 or from the requesting client that the download has completed. In the event that the requesting server cannot complete the download of the program, server 102 once again determines if any of the currently connected clients have the requested program available for download. If so, then the 'best' client is determined and the requesting client is allowed to continue downloading the program. In an embodiment of the invention, server 102 may attempt to improve reliability of actually being able to provide the entire content to the requesting client by only advertising the requested content as available if there is a plurality of clients currently logged into the peer-to-peer network with the content available. Here, if one client suddenly becomes unavailable to continue providing the requested content then the chances that there is another client ready to continue providing the content is increased. Decision block 308 of FIG. 3 is described in more detail next with reference to FIG. 4.

Figure 4:
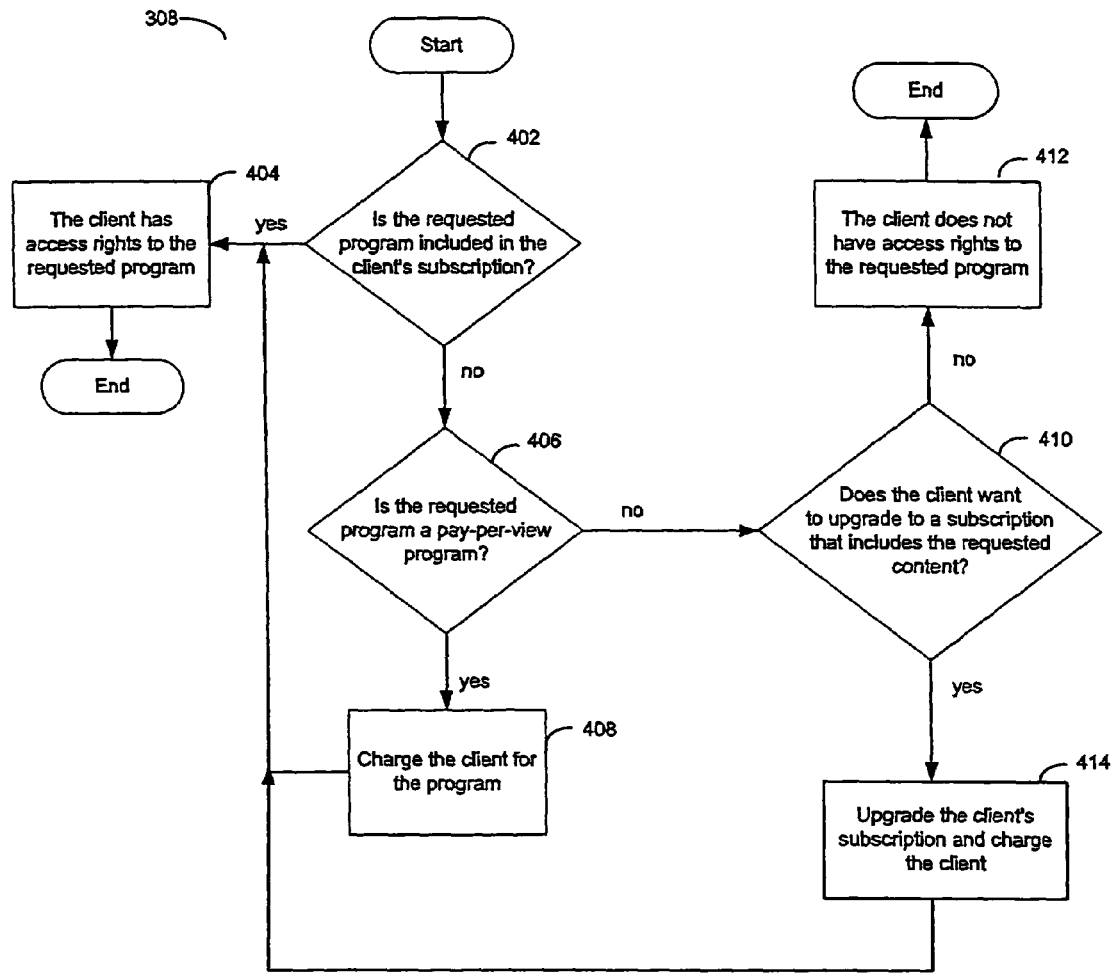
FIG. 4 is a flow diagram of one embodiment of determining whether a client has access rights to a requested program.

FIG. 4 is a flow diagram of one embodiment of determining whether a client has access rights to a requested program (decision block 308 of FIG. 3). Referring to FIG. 4, the process begins at decision block 402 where server 102 determines whether the requested program is included in the client's subscription. If the outcome to decision block 402 is positive, then control transfers to processing block 404 where the requesting client is determined to have access rights. The flowchart of FIG. 4 ends at this point. Alternatively, if it has been determined that the requested program is not included in the client's subscription, then control transfers to decision block 406.

At decision block 406, server 102 determines whether the requested program is a pay-per-view program. If the outcome to decision block 406 is negative, then control transfers to processing block 410 (discussed below). Alternatively, if it is determined that the program is a pay-per-view program, then control transfers to processing block 408 where the client is charged for the program. Control then transfers to processing block 404 where the requesting client is determined to have access rights. The flowchart of FIG. 4 ends at this point.

At decision block 410, server 102 determines whether the client wants to upgrade to a subscription that does include the requested program. If the outcome to decision block 410 is negative, then control transfers to processing block 412 where it is determined that the client does not have access rights to the requested program. The flowchart in FIG. 4 ends at this point. Alternatively, the client does want to upgrade the subscription and control passes to processing block 414. At processing block 414, the client's subscription is upgraded and the client is charged for the upgrade. Control then transfers to processing block 404 where the requesting client is determined to have access rights. The flowchart of FIG. 4 ends at this point. It is important to note that the invention is not limited to decision blocks 402 and 406 in determining whether the client has access rights. Access rights may be determined in a variety of ways and these examples are not meant to limit the invention.

Embodiments of the present invention may be implemented in software, firmware, hardware or by any combination of various techniques. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer). These mechanisms include, but are not limited to, a hard disk, floppy diskettes, optical disks, Compact Disc, Read-Only Memory (CD-ROMs), magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or the like.

Some portions of the detailed descriptions above are presented in terms of algorithms and symbolic representations of operations on data bits within a computer system's registers or memory. These algorithmic descriptions and representations are the means used by those skilled in the data processing arts to convey the substance of their work to others skilled in the art most effectively. An algorithm is here, and generally, conceived to be a self-consistent sequence of operations leading to a desired result. The operations are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    determining, at a server, whether content is available within a peer-to-peer network for a client in the peer-to-peer network to request;
    advertising the requested content as being available only when there is a plurality of clients currently on a peer-to-peer network that have the content available for download;
    receiving, at the server, a request from a client for that content, wherein the requesting client and the server are part of the peer-to-peer network;
    determining whether the requesting client has access rights to the content;
    if the requesting client has access rights to the content, then determining one or more other clients on the peer-to-peer network that have the content available for download;
    selecting, by the server, from the one or more other clients, a client closest to the requesting client;
    notifying the requesting client of availability of the content on the client closest to the requesting client that has the requested content;
    allowing the requesting client to download the content from the selected client;
    determining whether the download of the content from the selected client was able to be completed by the requesting client;
    if the download of the content was not able to be completed by the requesting client, then selecting a second client from the one or more other clients; and
    allowing the requesting client to continue downloading the content from the second client.

2. The method of claim 1, wherein the server is hosted by a television service provider and wherein the requesting client has a subscription with the television service provider.

3. The method of claim 2, wherein determining whether the requesting client has access rights to the content comprises:
    determining whether the content is included in the subscription; and
    determining whether one or more controls selected by the requesting client allow for viewing of the content.

4. The method of claim 3, wherein the one or more controls include one or more parental controls.

5. The method of claim 2, wherein determining whether the requesting client has access rights to the content comprises:
    determining whether the content is provided by the television service provider to the requesting client on a pay-per-view basis; and
    determining whether one or more controls selected by the requesting client allow for viewing of the content.

6. The method of claim 5, wherein the one or more controls include one or more parental controls.

7. The method of claim 1, wherein the requesting client and the one or more other clients on the peer-to-peer network have personal video recorder (PVR) functionality and are modified to allow stored content to be available to all clients on the peer-to-peer network.

8. The method of claim 1, wherein allowing the requesting client to download the content from the selected one or more clients comprises providing a uniform resource locator (URL) for the content stored at the selected client to the requesting client.

9. The method of claim 1, wherein allowing the requesting client to download the content from the selected client comprises sending a command to the selected one or more clients to start downloading the content to the requesting client.

10. A system, comprising:
    a server, wherein the server determines whether content is available within a peer-to-peer network for a client in the peer-to-peer network to request, advertises the requested content as being available only when there is a plurality of clients currently on a peer-to-peer network that have the content available for download, receives the request from a client for that content, wherein the requesting client and the server are part of the peer-to-peer network, wherein the server identifies a client on the peer-to-peer network that has the content available for download and which client is the closest client to the requesting client and wherein the server enables the requesting client to download the content;
    wherein the server determines whether the download of the content from the selected client was able to be completed by the requesting client, if the download of the content was not able to be completed by the requesting client, then wherein the server selects a second client and wherein the server allows the requesting client to continue downloading the content from the second client without identifying any other clients to the requesting client.

11. The system of claim 10, wherein the server is hosted by a television service provider and wherein the requesting client has a subscription with the television service provider.

12. The system of claim 11, wherein the server determines whether the requesting client has access rights to the content by determining whether the content is included in the subscription and determining whether one or more controls selected by the requesting client allow for viewing of the content.

13. The system of claim 12, wherein the one or more controls include one or more parental controls.

14. The system of claim 11, wherein determining whether the requesting client has access rights to the content comprises:
   determining whether the content is provided by the television service provider to the requesting client on a pay-per-view basis; and
   determining whether one or more controls selected by the requesting client allow for viewing of the content.

15. The system of claim 12 wherein the one or more controls include one or more parental controls.

16. The system of claim 10, wherein the requesting client and the one or more other clients on the peer-to-peer network have personal video recorder (PVR) functionality and are modified to allow stored content to be available to all clients on the peer-to-peer network.

17. The system of claim 10, wherein the server allows the requesting client to download the content from the selected client by providing a uniform resource locator (URL) for the content stored at the selected client to the requesting client.

18. The system of claim 10, wherein the server allows the requesting client to download the content from the selected client by sending a command to the selected client to start downloading the content to the requesting client.

19. A non-transitory computer-readable storage medium containing instructions which, when executed by a processing system, cause the processing system to perform a method, the method comprising:
   determining, at a server, whether content is available for subsequent selection and within a peer-to-peer network for a client in the peer-to-peer network to request;
   advertising the requested content as being available only when there is a plurality of clients currently on a peer-to-peer network that have the content available for download;
   receiving, at the server, a request from a client for that content, wherein the requesting client and the server are part of the peer-to-peer network;
   determining whether the requesting client has access rights to the content;
   if the requesting client has access rights to the content, then determining one or more other clients on the peer-to-peer network that have the content available for download;
   selecting, by the server, from the one or more other clients, a client closest to the requesting client;
   allowing the requesting client to download the content from the selected client;
   determining whether the download of the content from the selected client was able to be completed by the requesting client;
   if the download of the content was not able to be completed by the requesting client, then selecting a second client from the one or more other clients; and
   allowing the requesting client to continue downloading the content from the second client.

20. The non-transitory computer-readable storage medium of claim 19, wherein the server is hosted by a television service provider and wherein the requesting client has a subscription with the television service provider.

21. The non-transitory computer-readable storage medium of claim 19, wherein determining whether the requesting client has access rights to the content comprises:
   determining whether the content is included in the subscription; and
   determining whether one or more controls selected by the requesting client allow for viewing of the content.

22. The non-transitory computer-readable storage medium of claim 20, wherein determining whether the requesting client has access rights to the content comprises:
   determining whether the content is provided by the television service provider to the requesting client on a pay-per-view basis; and
   determining whether one or more controls selected by the requesting client allow for viewing of the content.

23. The method of claim 1, further comprising:
   advertising content as being available at the server only when there is a plurality of clients currently on a peer-to-peer network that have the content available for download.

24. The non-transitory computer-readable storage medium of claim 19, wherein the method comprises advertising content as being available at a server only when there is a plurality of clients currently on a peer-to-peer network that have the content available for download.

* * * * *

UNITED STATES PATENT AND TRADEMARK OFFICE
CERTIFICATE OF CORRECTION

PATENT NO. : 8,413,198 B2  Page 1 of 1
APPLICATION NO. : 10/987344
DATED : April 2, 2013
INVENTOR(S) : Patrick Connor and Scott P. Dubal It is certified that error appears in the above-identified patent and that said Letters Patent is hereby corrected as shown below:

In the Claims:

Column 10
Line 21: 19 should be --20--

Signed and Sealed this
Seventh Day of January, 2014

Margaret A. Focarino
*Commissioner for Patents of the United States Patent and Trademark Office*